United States Patent [19]

Cayton et al.

[11] 4,294,179
[45] Oct. 13, 1981

[54] DIBBLE TUBE SOIL PLUG PLANTER

[75] Inventors: David W. Cayton; Errol C. Armstrong; Angus B. MacKenzie, all of Salinas, Calif.

[73] Assignee: Bud Antle, Inc., Salinas, Calif.

[21] Appl. No.: 62,667

[22] Filed: Aug. 1, 1979

[51] Int. Cl.³ ............................ A01C 11/02; A01C 5/04
[52] U.S. Cl. ....................................... 111/3; 111/89
[58] Field of Search .................. 111/2, 3, 89; 47/73, 47/87, 86

[56] References Cited

U.S. PATENT DOCUMENTS

| | | | |
|---|---|---|---|
| 577,539 | 2/1897 | Speidel | 111/2 |
| 2,514,522 | 7/1950 | Shelton | 111/3 |
| 2,899,918 | 8/1959 | McMillan | 111/3 |
| 3,306,239 | 2/1967 | Martin, Jr. | 111/3 X |
| 3,394,667 | 7/1968 | White | 111/89 X |
| 3,446,164 | 5/1969 | Huang et al. | 111/3 |
| 3,797,417 | 3/1974 | Hahn | 111/4 |
| 3,799,078 | 3/1974 | Blackmore et al. | 47/87 X |
| 3,805,532 | 4/1974 | Kistner | 47/9 X |
| 4,031,832 | 6/1977 | Edwards | 111/4 |
| 4,122,784 | 10/1978 | Joswig | 111/3 |
| 4,130,072 | 12/1978 | Dedolph | 111/2 |
| 4,156,395 | 5/1979 | Edwards et al. | 111/3 |

FOREIGN PATENT DOCUMENTS

| | | | |
|---|---|---|---|
| 850951 | 9/1970 | Canada | 111/4 |
| 239593 | 5/1910 | Fed. Rep. of Germany | 111/89 |
| 2638846 | 3/1977 | Fed. Rep. of Germany | 111/2 |
| 2854922 | 7/1979 | Fed. Rep. of Germany | 111/2 |
| 2007952 | 5/1970 | United Kingdom | 47/86 |
| 210521 | 3/1968 | U.S.S.R. | 111/2 |

Primary Examiner—Steven A. Bratlie
Attorney, Agent, or Firm—Townsend and Townsend

[57] ABSTRACT

A planter is moved through a field to place two rows of four plants on the top of a planting bed between adjacent irrigation furrows. The tray carrying the transplants is registered horizontally and vertically to a plug receiving cylinder by respective cams and a supporting chain. Upon registry, polymer plugs containing sprouted plants therein are ejected, typically eight at a time, by ejecting fingers penetrating the plant receiving holes. Ejection occurs with the plants horizontally disposed into receiving concavities defined within a rotating cylinder. Rotation of the cylinder drops the ejected plants into receiving funnels, one for each plant. Plant downward travel halts at a reciprocating plate. Insertion of the plug into the ground begins with penetration of the ground by a dibble spike followed by circumscribing penetration of a dibble tube around the spike. When the spike is withdrawn, the plant is reciprocated into registry with the dibble tube and the plant blown under pressure down to the bottom of the dibble tube. With the air pressure applied, the dibble tube is retracted, leaving the plant in its wake.

3 Claims, 14 Drawing Figures

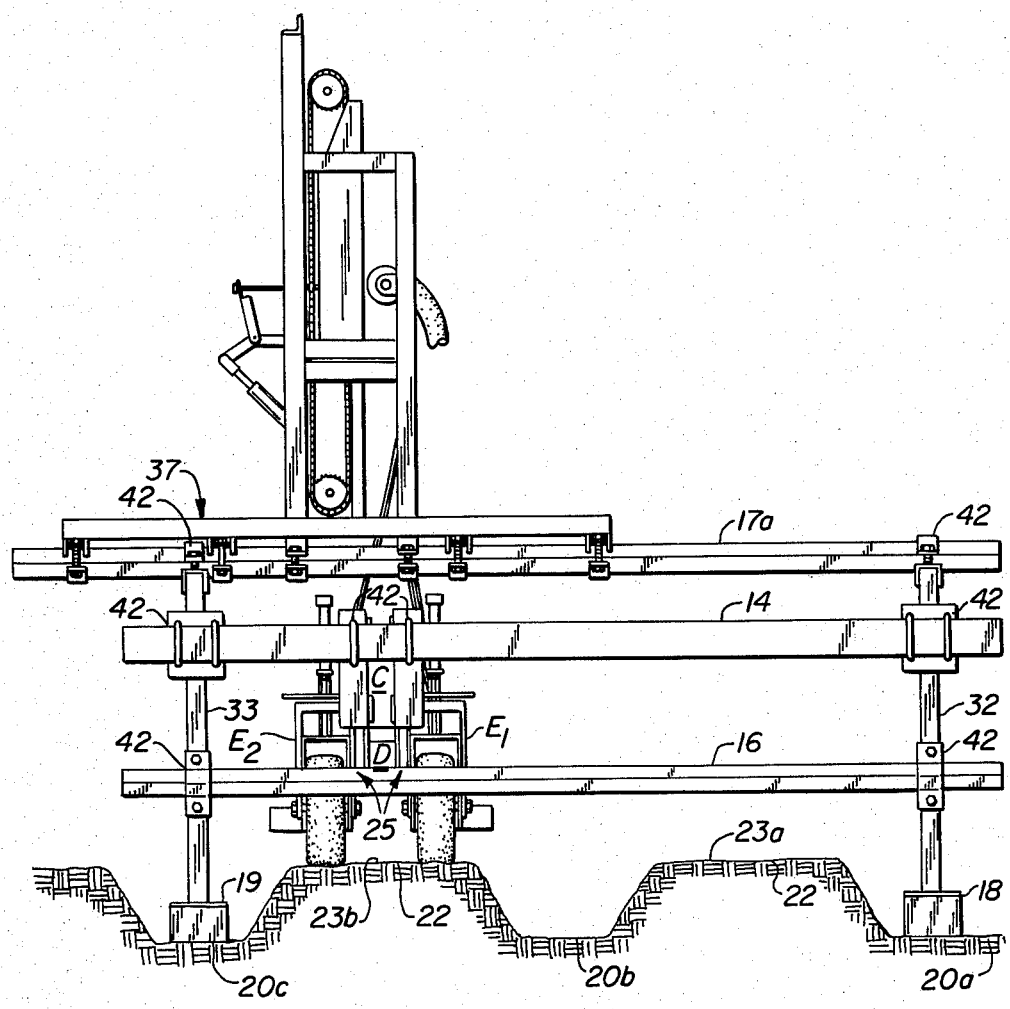
Fig._1a.

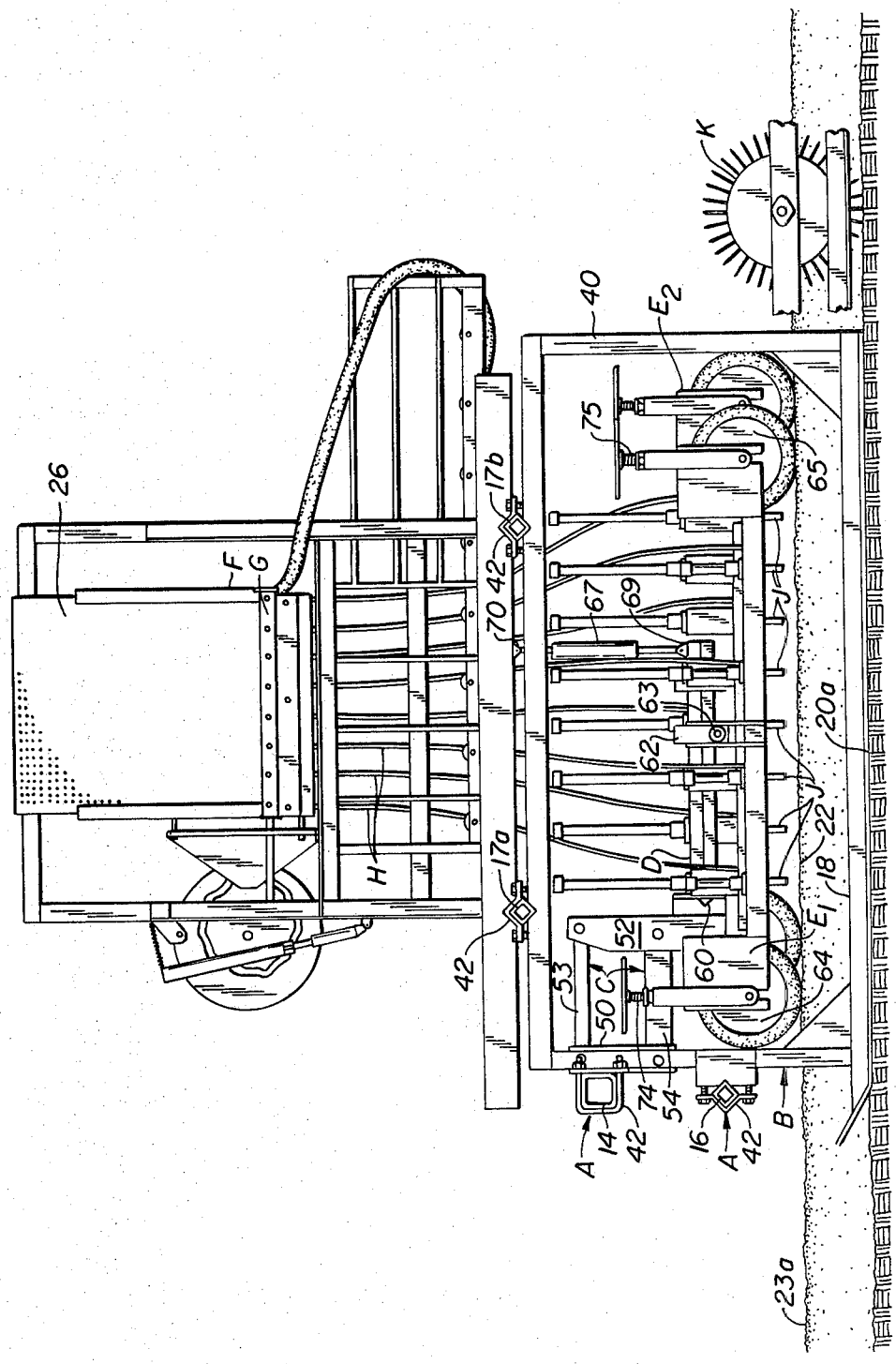

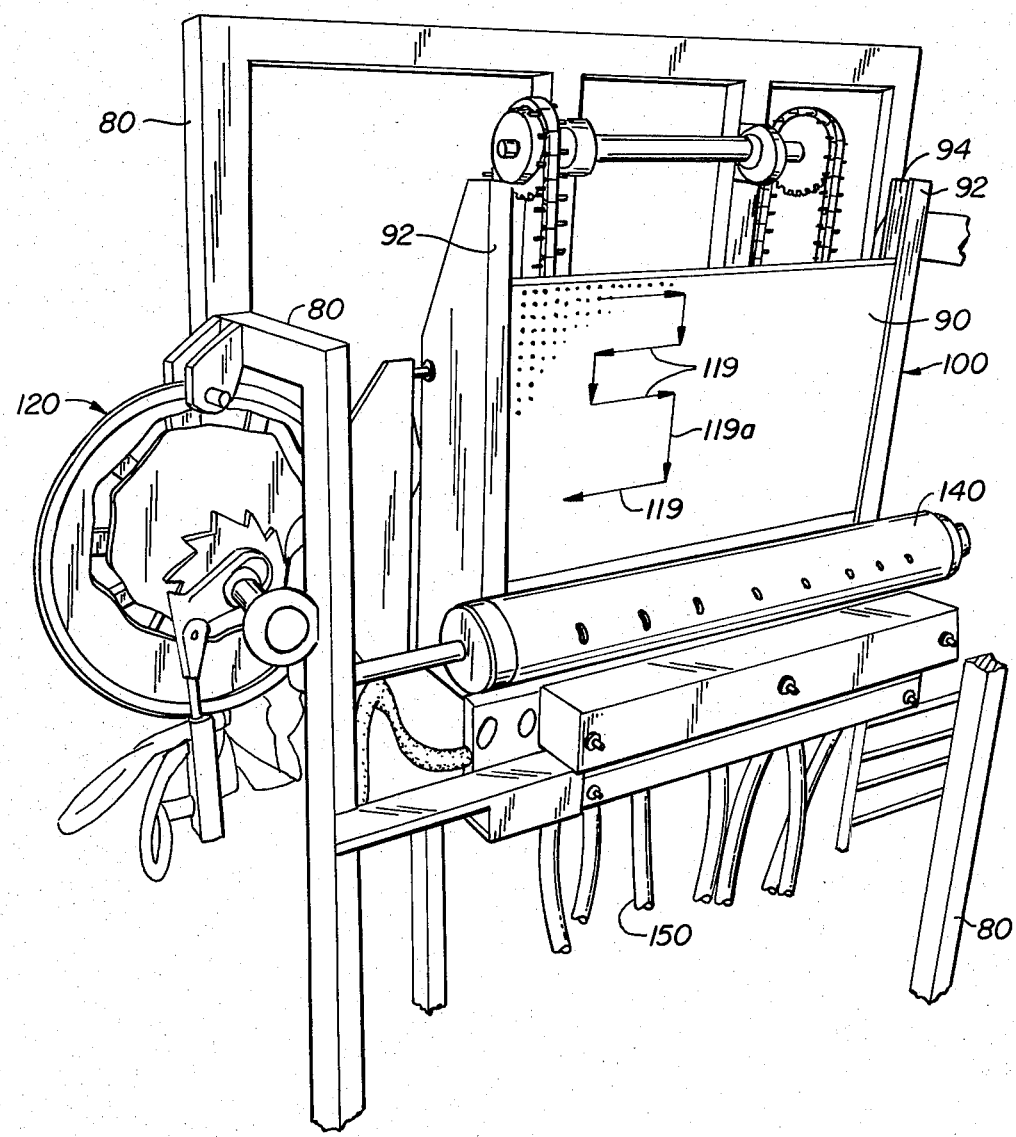
Fig._2.

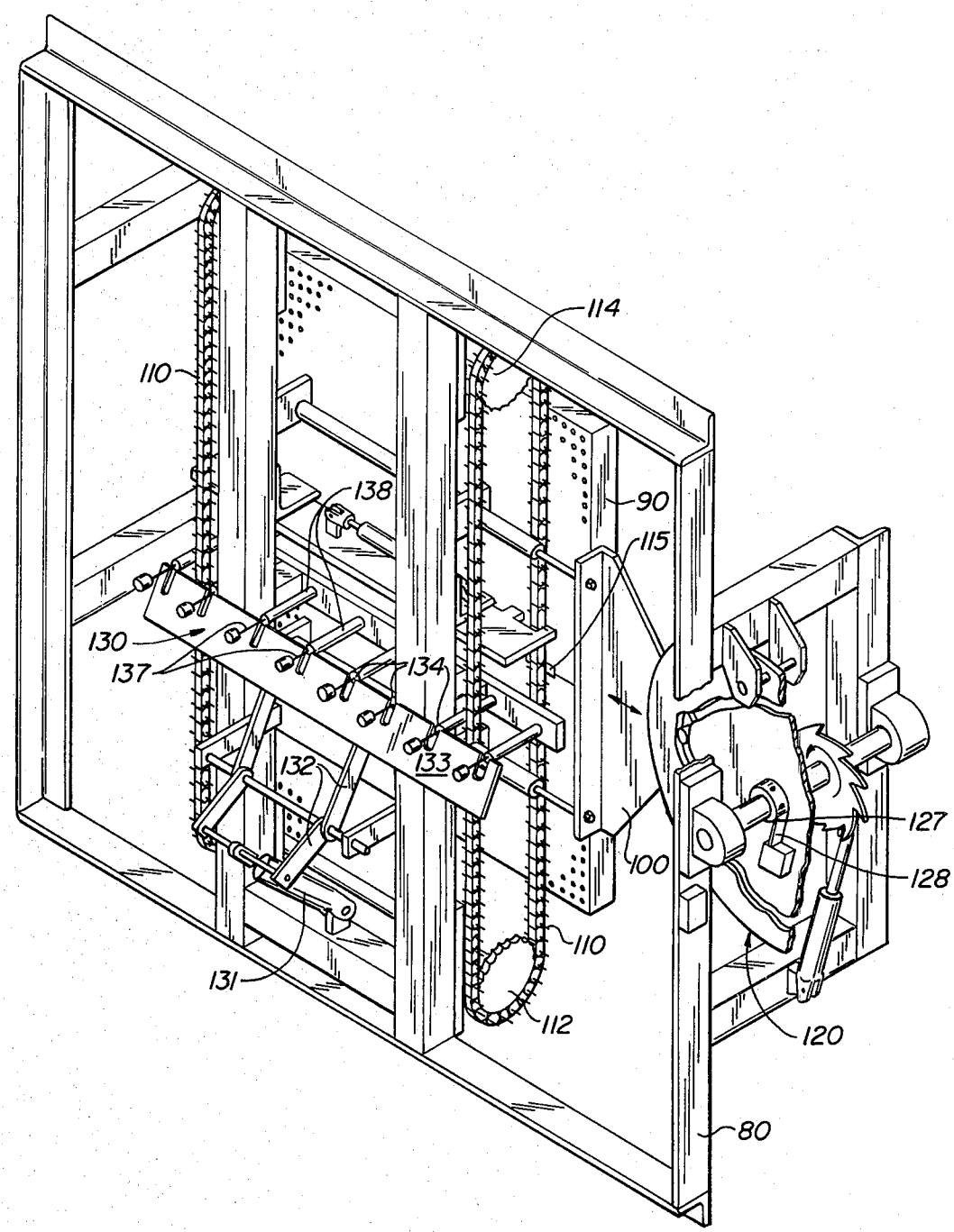
Fig._3a.

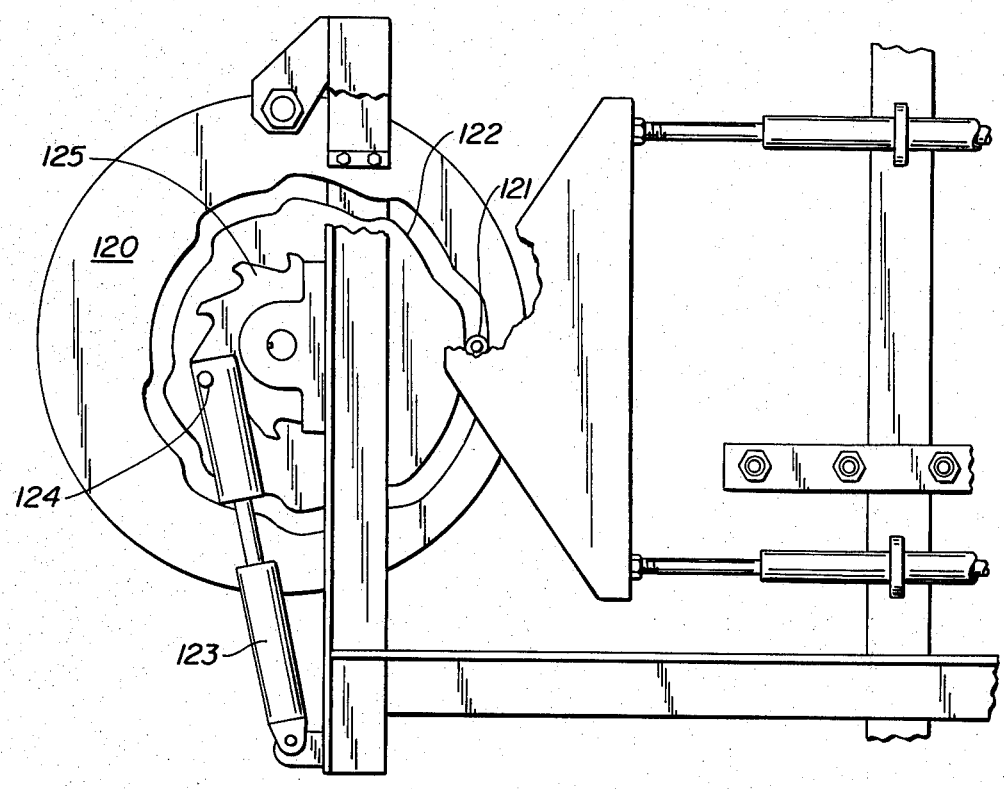
Fig.__3b.

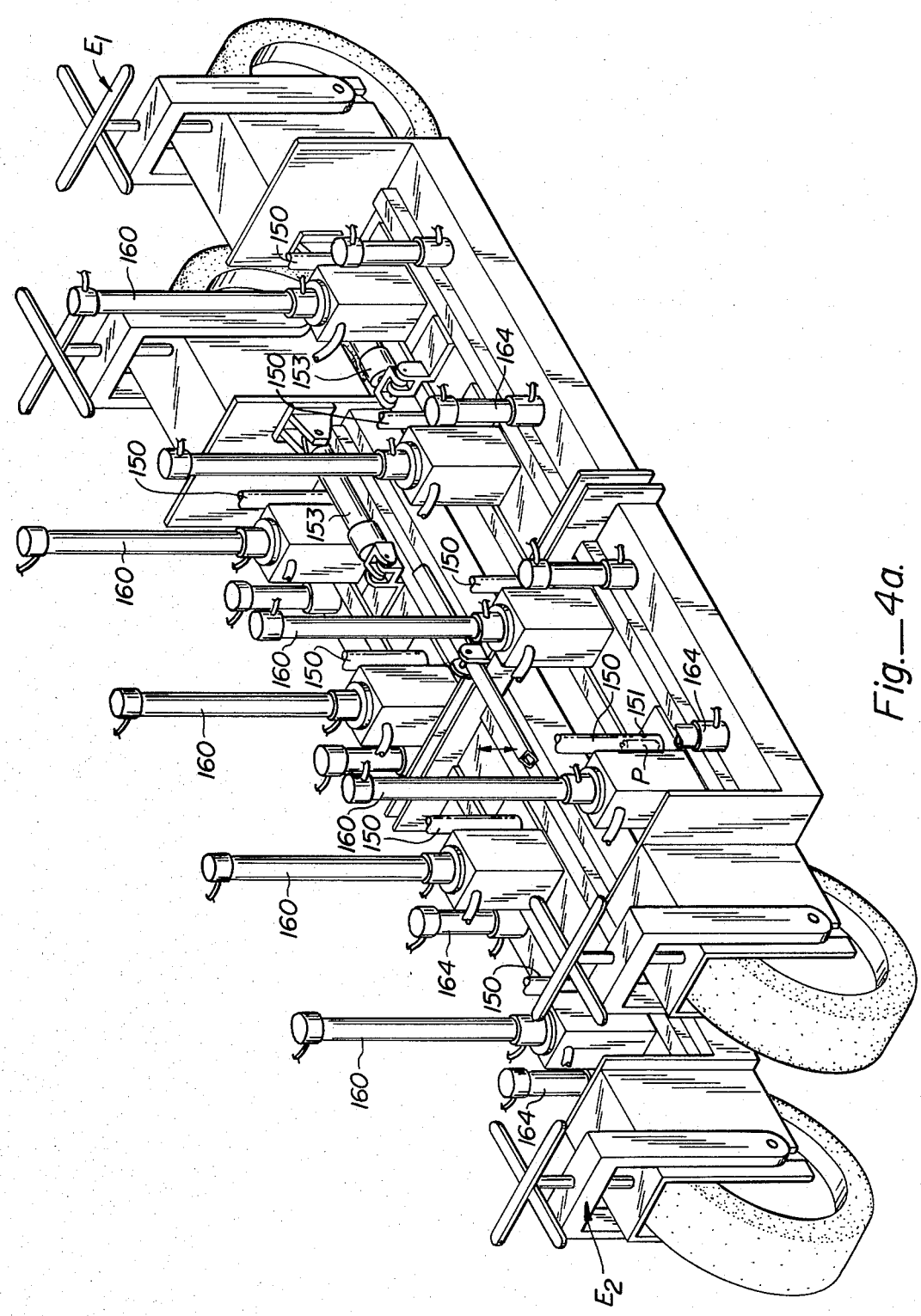
Fig._4a.

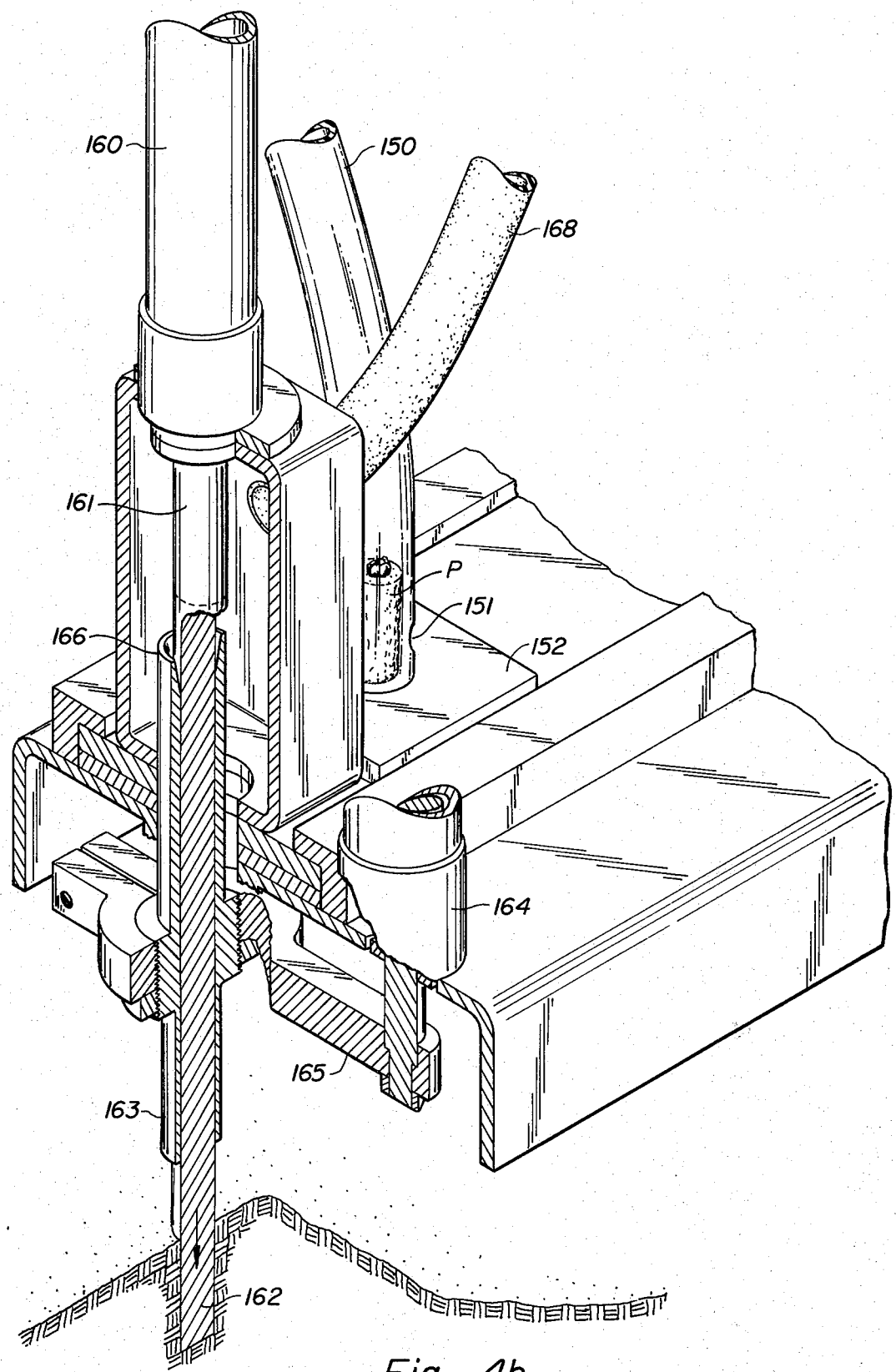
Fig._4b.

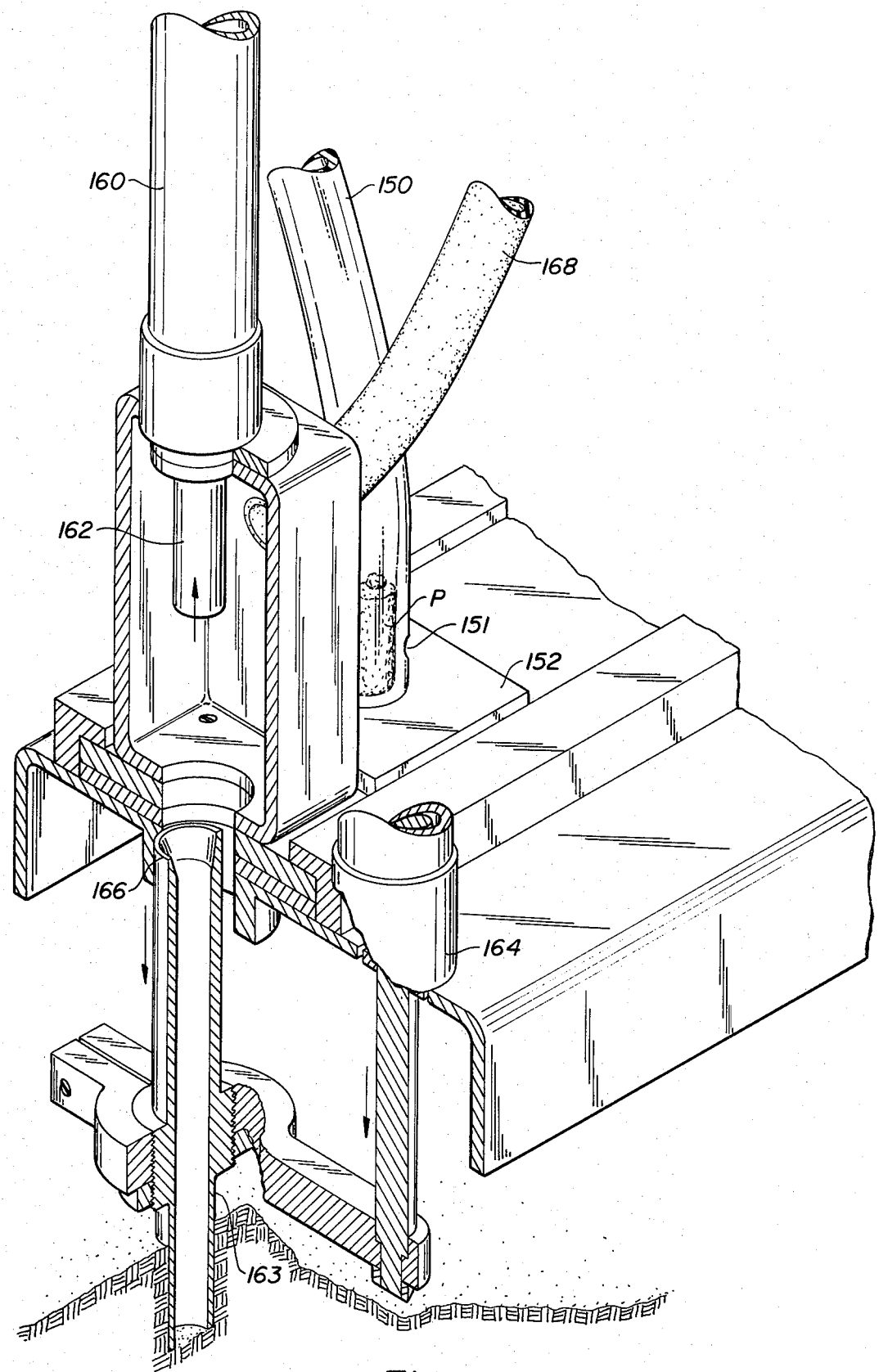
Fig._4c.

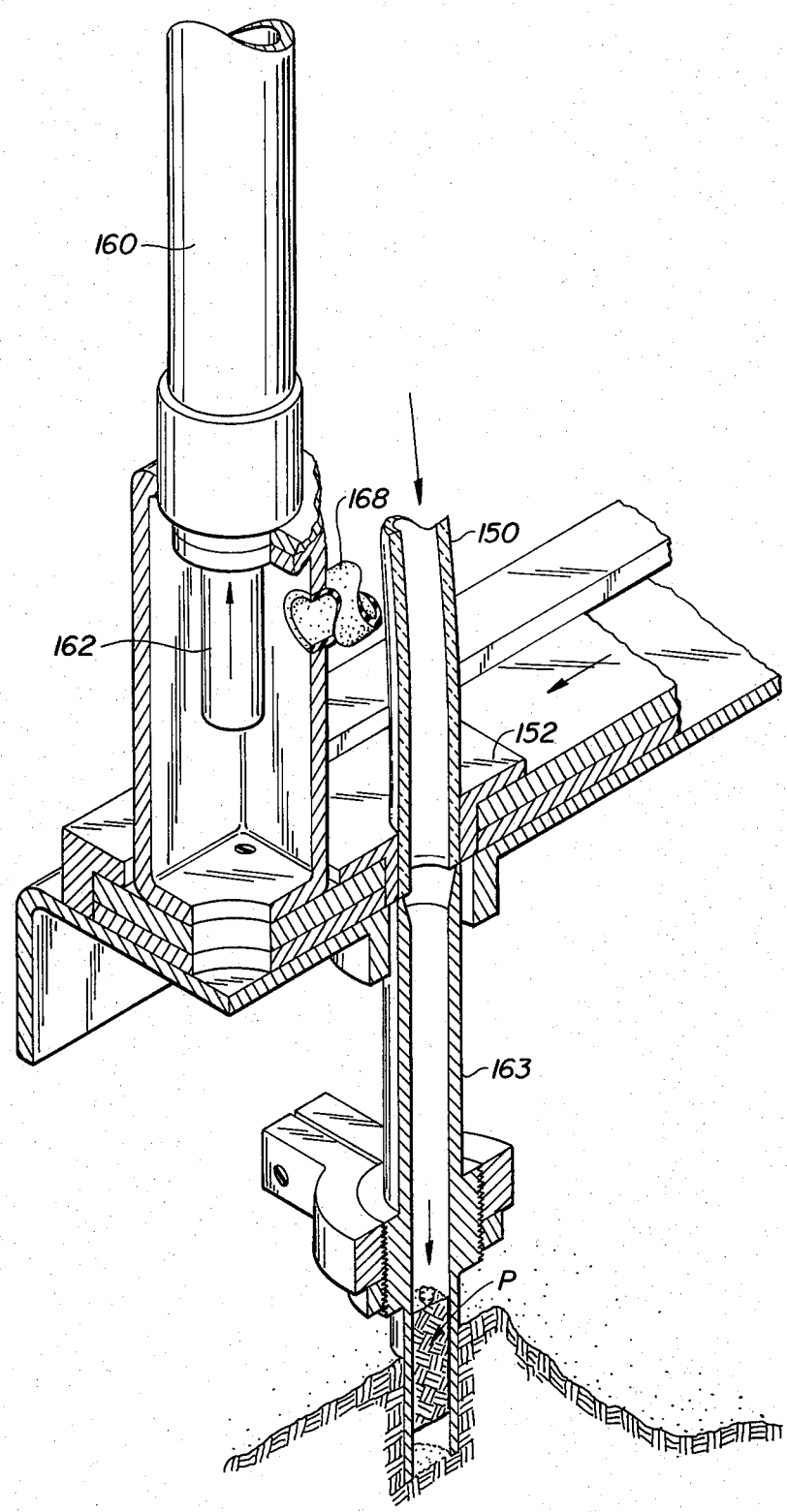
Fig._4d.

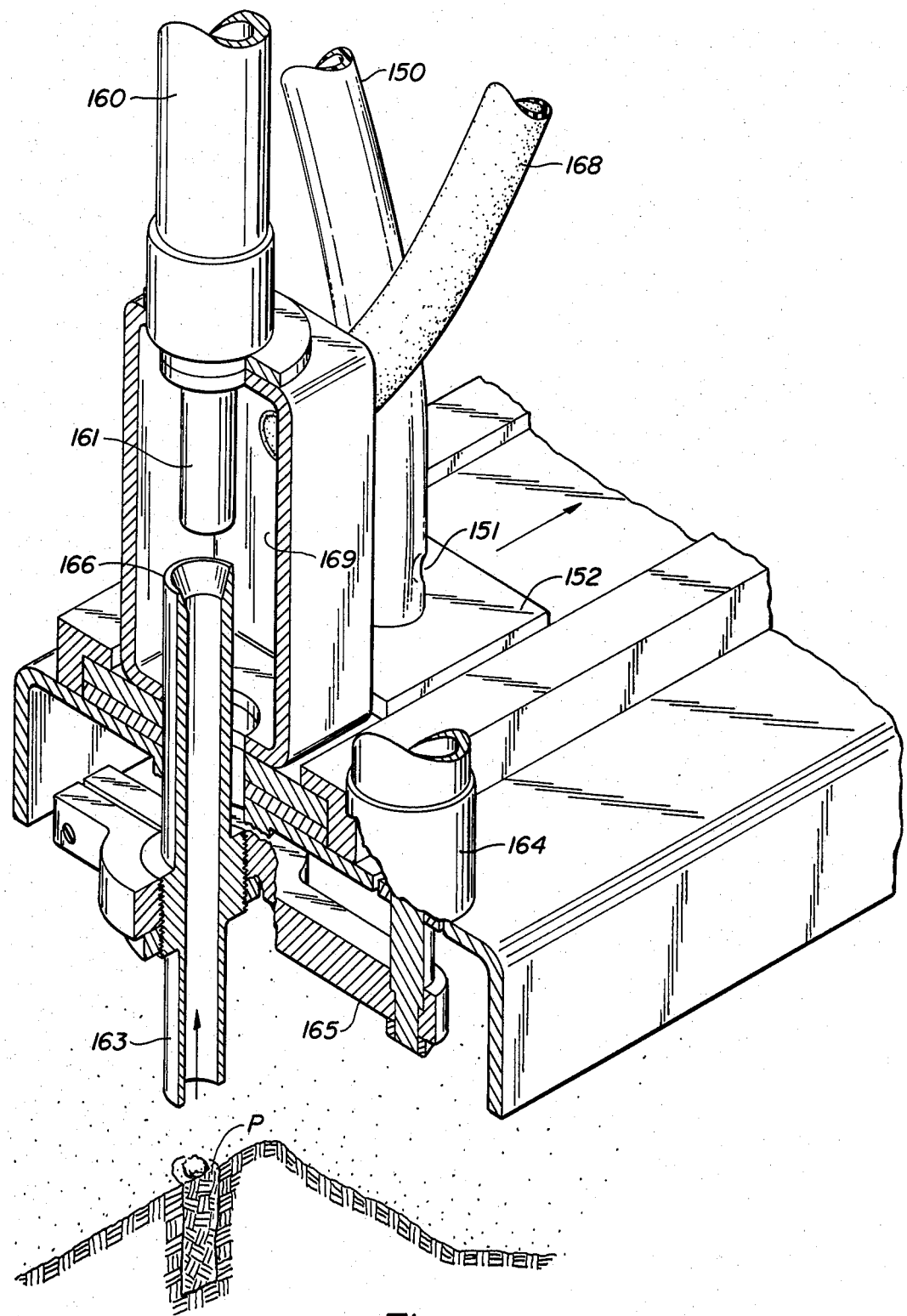
Fig._4e.

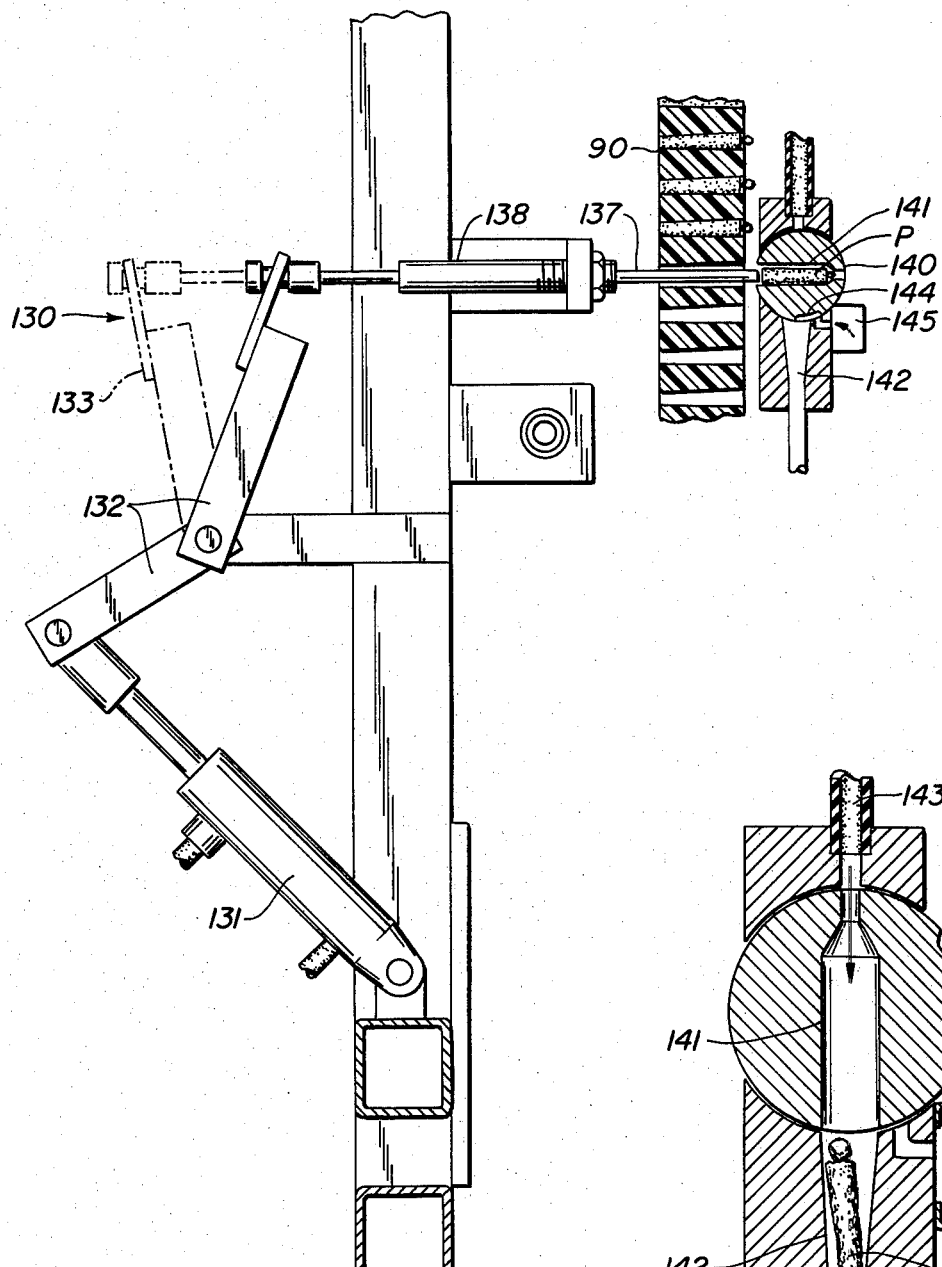
Fig.__5a.
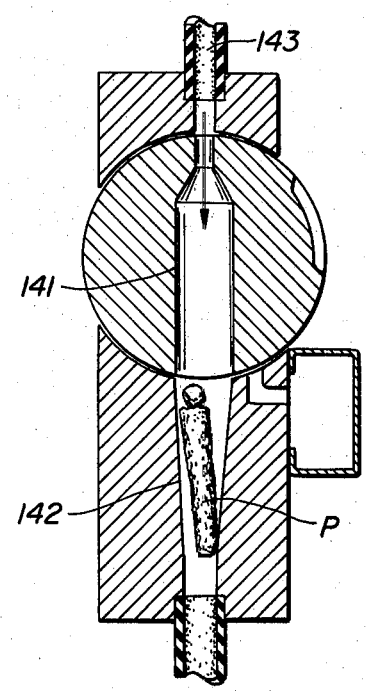
Fig.__5b.

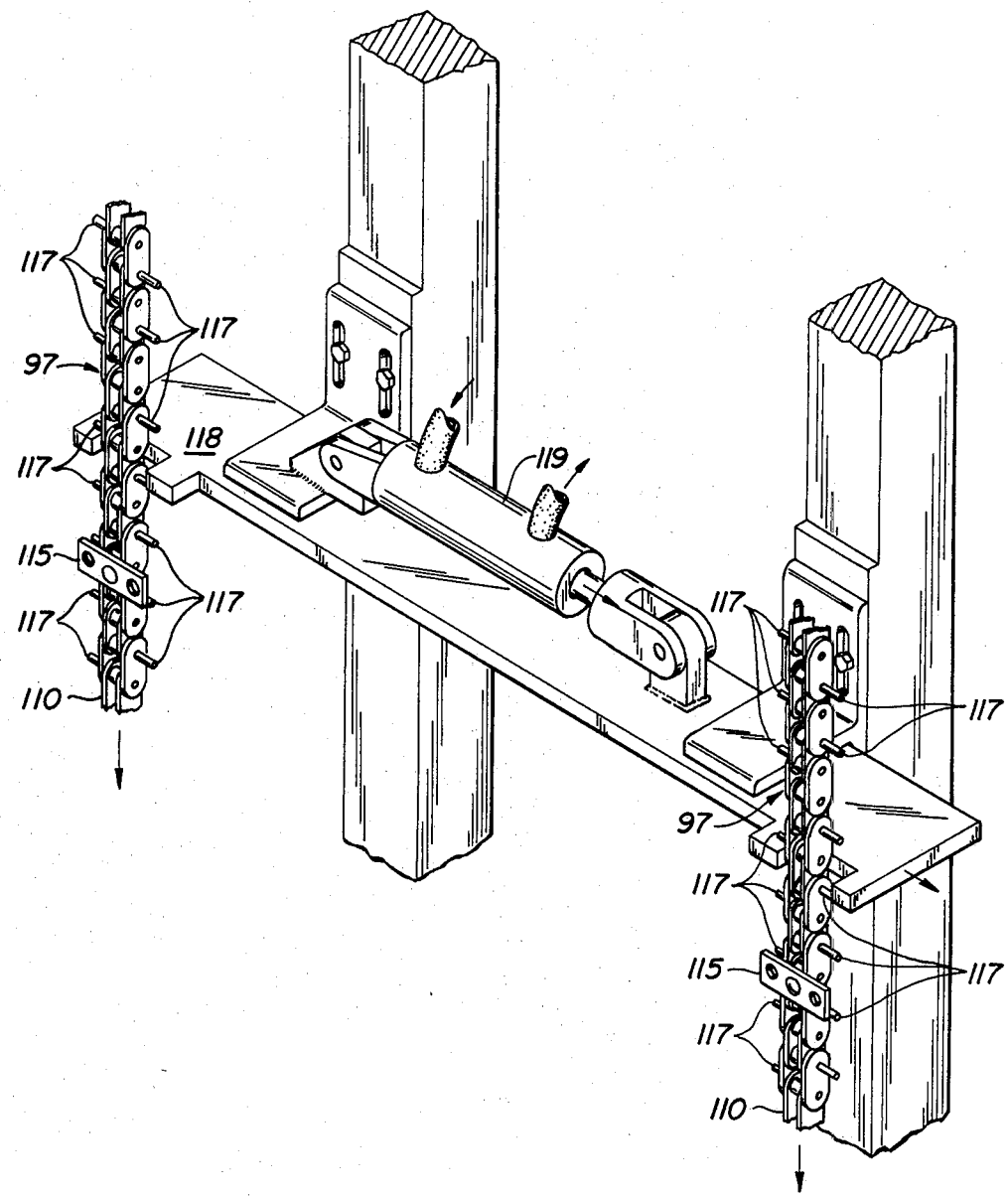
Fig._6a.

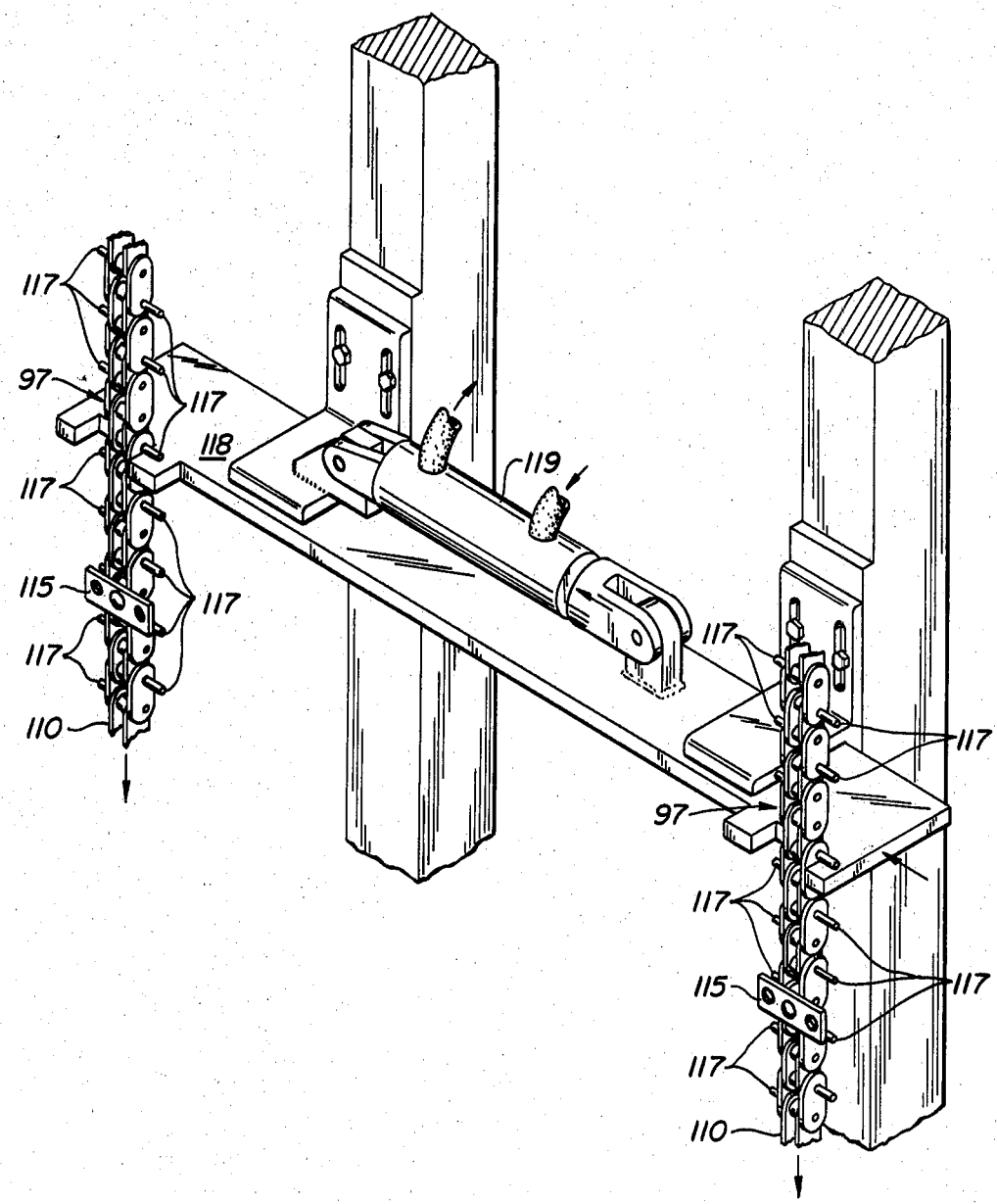
Fig._6b.

DIBBLE TUBE SOIL PLUG PLANTER

This invention relates to an automatic planter wherein polymerized soil plugs containing plants are planted into the ground behind the path of planter travel.

SUMMARY OF THE PRIOR ART

Dedolph U.S. Pat. No. 4,130,072 and the prior art cited therein suggest growing plants within polymerized soil plugs, and by handling the plugs alone, transplanting the plugs to the ground.

Typically, in such transplanting the plants are in a "just sprouted" state. Therefore, handling of the plants by the soil plugs alone must occur; otherwise destruction of the plant immediately occurs.

Plants utilized have been grown on trays approximately two feet long, one foot wide. Each tray includes 20 columns of 40 half-inch plug receiving holes, all on $\frac{5}{8}$ inch centers. Typically, the plugs are cast by methods not dissimilar to those described in Dedolph U.S. Pat. No. 4,130,072 and Kistner U.S. Pat. No. 3,805,532.

SUMMARY OF THE INVENTION

A planter is moved through a field to place two rows of four plants on the top of a planting bed between adjacent irrigation furrows. Plants ready for transplant are disposed in trays within polymerized cast soil plugs. Each plug is disposed within the tray in a hole. Each tray has rows and columns of plant receiving holes extending through each tray. The planter carrying the plugs moves in increments and sets the planter mechanism in a stationary position over the top of the planting bed prior to plug planting. The tray carrying the transplants is registered horizontally and vertically to a plug receiving cylinder by respective cams and a supporting chain. Upon registry, polymer plugs containing sprouted plants therein are ejected, typically eight at a time, by ejecting fingers penetrating the plant receiver holes. Ejection occurs with the plants horizontally disposed into receiving concavities defined within a rotating cylinder. Rotation of the cylinder drops the ejected plants into receiving funnels, one for each plant. Upon return rotation of the cylinder, connection of a wind chest to the receiving funnel occurs with an air blast forcing the plug and carried plant downward through a tube. Plant downward travel halts at a reciprocating plate. Insertion of the plug into the ground begins with penetration of the ground by a dibble spike followed by circumscribing penetration of the dibble tube around the spike. When the spike is withdrawn, the plant is reciprocated into registry with the dibble tube and the plant blown under pressure down to the bottom of the dibble tube. With the air pressure applied, the dibble tube is retracted, leaving the plant in its wake. Compaction occurs by a soft wheel running over the newly sprouted plant. After planting eight plants simultaneously, the planter incrementally advances leaving in its wake groups of plants, typically eight lettuce plants on twelve inch centers staggered in approximate 6 inch spacing one from another.

OTHER OBJECTS AND ADVANTAGES

An object of this invention is to disclose a system of ejection from transplant trays of soil plugs containing newly sprouted plants. According to this aspect of the invention, the tray is placed on end in a rack. When the tray is "on end" the top of the tray and the bottom of the tray are disposed substantially horizontally and the plants sprouting therefrom are horizontally disposed. The tray slides downward in a rack with the growing plants on one side of the tray and the bottom of the soil plugs disposed towards the other side of the tray. Plants are stopped with a row of 40 in vertical registry to a row of typically eight ejectors. The ejectors are registered to the bottom of the eight soil plugs and, by passage through the soil plug holes, remove the plugs with the plant proceeding first. The plugs as removed are received into cavities defined within a cylinder disposed along a horizontal axis. Once the plants are within the cylinder, the cylinder rotates 90° and the plants drop into receiving funnels. Upon rerotation of the cylinder to receive the next group of plants, a wind chest is communicated to the funnels. The plants are then blown down plant receiving tubes to and towards the dibble planter. Registry of the tray to the plug ejector mechanism is accomplished by a chain and cam follower. The cam positions the tray horizontally at five different positions so that after eight ejections the entire row of 40 is vacated.

An advantage of the ejector is that the transplant tray is emptied by the handling of plug alone. The plants contained within the soil plugs are essentially untouched.

Yet another advantage is that the tray is emptied by a "square wave" motion pattern. Typically, the tray is advanced to one side in five separate sequential steps. When the row is empty, it is dropped down to the next full row. This next row is then emptied by five return incremental steps in the opposite direction. When this second row is empty, the next downward dropping step occurs. Emptying of the tray occurs in essentially a square wave motion pattern.

A further object of this invention is to disclose a system of plug transport to the ground. Plants are received from the plug ejector into cavities defined into the rotating cylinder. The plants lie along a horizontal axis. The cylinder rotates to dispose the cavity downward with the bottom or base of the plug towards the ground and the plant protruding from the plug upwardly and away from the ground. Upon cylinder rotation, the plug falls into a transport funnel. The plant enters the top of the funnel and is directed to a transport tube mounted to the bottom of the funnel. Upon rerotation of the cylinder, travel of the plug from the funnel through the tube to the dibble planter is compelled by an air blast.

An advantage of the plug transport system is that the plugs can be removed from a first side-by-side spacing in the tray and given a second and different side-by-side spacing as planted into the ground. The spacing is in effect variable from the tight side-by-side spacing necessary for efficient greenhouse usage to the broad side-by-side spacing necessary for growth to maturity in a field where harvest occurs.

A further object of this invention is to disclose a system, process, and apparatus of planting into the ground. According to this aspect of the invention, a dibble plunger first penetrates into the ground a distance equal to the depth of the plug to be planted. Once the plunger is in place, a dibble tube concentrically penetrates into the ground around and about the dibble plunger. Upon full penetration of the dibble tube, the plunger is retracted. A sliding plant then registers a tray removed and tube transported plug immediately over the dibble tube. Typically, air pressure is communicated to the space above the dibble tube and the plug. With registry over the dibble tube, the plug, compelled by both gravity and air pressure, falls into position in the ground. Thereafter and with air pressure still applied, the plate is reciprocated and the dibble tube withdrawn to leave the plug planted in the ground.

An advantage of this dibble tube planter is that transplant plugs can be adjustably left in the ground in virtually all types of soil conditions. For example, where heavy soil clods are present, and conventional wheel planters are of little use, the dibbe tube planting scheme herein disclosed prevents the solid soil clods from interfering with correct plug planting. Likewise, in extremely moist conditions—like those after heavy rains—planting can still occur, the mud being no obstacle to the planting mechanisms here disclosed.

A further advantage of the plug planter mechanism herein disclosed in that it is relatively self-cleaning.

Yet another advantage is that the plants carried in the plugs, because of their newly sprouted condition, have a high degree of durability. As part of the planting process the newly sprouted plants are typically run directly over by a soft tire to insure both soil compaction and planting to the desired depth.

Other objects, features and advantages of this invention will become more apparent after referring to the following specification and attached drawings in which:

FIG. 1a is an end elevation of a sled supporting the planter of this invention with paired planting chassis shown passing within conventional furrows;

FIG. 1b is the side elevation of the apparatus of FIG. 1a;

FIG. 2 illustrates the plant receiving cylinder and a tray passing downwardly between paired racks with the cam follower for positioning the tray in registry to the plug extraction mechanisms;

FIG. 3a is the plug extraction mechanism of the present invention illustrated from the opposite side of that shown in FIG. 2;

FIG. 3b is a detail of the cam of this invention utilized with the plug extractor;

FIG. 4a is a perspective view of the two side-by-side planting chassis of this invention with each chassis containing spaced dibble mechanisms for the simultaneous planting of four plugs from each chassis;

FIG. 4b is a detail of a single dibble tube planting mechanism on one of the chassis with the dibble spike shown punching a hole in the top of the furrow equal in width and depth to the spatial interval to be occupied by a soil plug containing a plant;

FIG. 4c illustrates the mechanism of FIG. 4b after the dibble plug has been circumscribed by a dibble tube and the dibble spike retracted;

FIG. 4d illustrates the reciprocation of a tube containing a plant into a position overlying the dibble tube with the plant shown dropping to the bottom;

FIG. 4e illustrates the retraction of the dibble tube leaving the plant in place;

FIG. 5a is a detail of the plant ejector mechanism for one plant;

FIG. 5b is an illustration of the plant receiving cylinder, shown in FIG. 5a receiving a plant, discharging the plant to the tube; and, FIG. 6a is a perspective view of a chain mechanism for indexing a tray vertically to the plug extractor mechanism.

FIG. 6b illustrates the vertical indexing mechanism after it has operated to lower the tray by one row from that shown in FIG. 6a.

Referring to FIGS. 1a and 1b, a three point tractor hitch A having support bars 14, 16 is shown pulling a sled B. Sled B is shown having paired runners 18, 19 spaced for running along the bottom of respective irrigating furrows 20 disposed between and on either side of planting beds 22.

Supported from sled B by a parallelogram support C is a horizontal bar D. Horizontal bar D is capable of only of movement upwardly and downwardly with respect to a parallel disposition over the irrigating trenches 20 and planting beds 22.

Horizontal bar D is typically rotatable from side to side as indicated at arrow 25 and has attached thereto at pivot points respective chassis $E_1$ and $E_2$. Respective chassis $E_1$ and $E_2$ are the mechanisms to which the dibble tube planters J all attach.

Protruding upwardly and supported by the sled is a rack F. Rack F includes an extractor assembly G, which receives plugs from transplant trays 26 and transports the plugs via tubes H to the dibble planters J. A distance measuring wheel K measures the distance that sled B is transported over the ground and stops the pulling tractor at the precise interval that the planting is desired.

Before describing the invention in detail, a summary of operation is in order.

Typically, transplant trays 26 are placed in rack F. Mechanism associated with the rack F causes respective groups of eight soild plugs in rows of forty soil plugs to be ejected into plug extractor G. From the plug extractor G, the soil plugs are transported by tubes H down to the dibble tube planters J. At the planters J, holes are punched into the ground into which the plugs are placed. After planting, the dibble tube mechanism J completely retracts, and the entire machine is pulled forward typically by a tractor (not shown) at the attached three point hitch A. Distance measuring wheel K supplies signals to the tractor so that sequential and staggered movements of the planter mechanism down the field occur, leaving in the wake of the machine transplanted soil plug plants.

Typically, and in the case of lettuce fields the respective irrigating trenches are approximately 40 inches center to center. Plants are placed on twelve inch centers at six inch spacings between rows with the plants of one row being staggered six inches with respect to the plants of the other row. Consequently, the chassis $E_1$, $E_2$ are staggered by six inch intervals and separated a total of ten to twelve inches, one from the other. Other staggered relationships can be used for other crops.

Having set forth the general construction and operation of the disclosed apparatus, attention will be devoted to detail.

In order to understand the planter of this invention, some attention must be given to the geometry of the furrows in a typical lettuce field. Preferably, the center to center spacing of respective furrows 40 is forty inches. The sled herein includes total horizontal width on the order of ninety-six inches so that adjustment can be made for varying bed and furrow spacings between forty inch center-to-center furrows and forty-eight inch center-to-center furrows.

The particular sled S here shown spans two furrows. A runner 18 fits within just furrow 20a. Second runner 19 within a second furrow 20c. No runner is here shown running along the bottom furrow 20b. Sled B spans two planting beds 23a and 23b.

Sled B includes at its leading end vertical members 32, 33 having clamped crosspieces 14, 16 fastened between them. At the topmost portion of the sled, there is included a support super structure and catwalk generally denominated 37. As this is a conventional type structure, to such machinery, further explanation will not be given.

The catwalk is typically mounted to upper vertical members 17a, 17b. The rear portion of the sled is similar to a forward portion and includes respective rear vertical members 40.

As the three point hitch A is pulled down the field, the sled B follows. Three point hitch A can be lifted by the hauling tractor (not shown). When this is done, sled B is lifted free of the furrows.

Between vertical and horizontal members of the sled B, adjustable clamping is provided. Such clamping is by members 42. These respective clamping members enable sled B and the planting mechanism drawn thereby to conform to varying furrow spacings found in all types of fields. For example, center to center furrow spacings in the western United States for the planting of lettuce can vary.

Each of the paired chassis $E_1$, $E_2$ fastens to a drawing bar D. Drawing bar D is in turn supported by a parallelogram support C. Parallelogram support C enables the drawing bar D to move up and down with respect to the sled B. However, since parallelogram type linkage is used, bar D can only move in this upward and downward disposition in a parallel mode to the top of the respective furrows 23a, 23b, etc.

Parallelogram linkage C includes forward vertical plate member 50, rearward vertical plate member 52, and generally horizontal parallelogram members 53, 54. Members 53, 54 maintain members 50, 52 in parallel relation as the suspended chassis $E_1$ and $E_2$ move up and down relative to the towing sled B.

Parallelogram linkage C is usually provided with an end of travel linkage on the horizontal disposition shown. Specifically, travel on the order of five inches is allowed to accommodate variations in the height of the soil bed over the furrow.

Protruding horizontally outward from the parallelogram linkage is a horizontal bar D. Horizontal bar D is pivotally attached to the parallelogram linkage C at pivot 60 (see FIG. 1b). Thus, pivot of bar D at the parallelogram linkage C can occur in the direction of arrows 25.

Each one of the respective chassis $E_1$, $E_2$ is supported to the side of the horizontal bar D. Chassis $E_1$ is supported on one side and is forward by six inches from chassis $E_2$. Chassis $E_2$ is supported on the opposite side and is rearward from chassis $E_1$ by six inches. Support typically occurs at a clamp 62, which provides for pivoted movement about a pivot point 63 for the chassis $E_1$. A similar clamp mounts and similar pivot pivots chassis $E_2$.

At the forward and rear ends of the respective chassis $E_1$, $E_2$, there are respective wheels 64, 65. These wheels can pass over the planting beds at their tops.

Typically, horizontal bar D is supported by hydraulic piston 67. Piston 67 fits to a pivoted clevice 69 in the end of bar D and fastens upwardly at clevice 70 to the towing sled. By maintaining a constant hydraulic pressure in the clevice 69, the pressure of the planter mechanism at the wheels 64, 65 is adjustable as the planter passes over the plant bed.

Wheels 64, 65 are adjustable in traveling height over the planting bed by means of jacks 74, 75. Vertical adjustment of the respective soft tire wheels 64, 65 can occur by releasing the lock nuts on the jacks and adjusting the height by rotation of the handles affixed thereto.

Referring to FIGS. 2, 3a and 3b, the plug extractor mechanism of this invention can be set forth. A summary recitation will first be used; a detailed explanation on the component parts will follow.

Protruding upwardly from sled S is a frame mechanism 80. The mechanism includes a tray of transplants 90, held by a rack 100, which rack is supported vertically and registered to a plant extractor by chain 110. Horizontal movement and registry to a plant extractor is occasioned by a cam 120. A plant extractor 130 causes plugs to be ejected into a receiving cylinder 140. The ejected plugs then pass to funnel mechanisms and wind chests described in FIGS. 5a, 5b and 5c.

Tray 90 is approximately 14 inches wide, 1¾ inches deep. Half inch holes are drilled on ⅜ inch centers with 42 holes extending lengthwise and 22 holes extending across. Each of the holes are provided with a very slight taper from the bottom towards the top and filled with polymerized soil. In this polymerized soil, clay coated seed, such as lettuce seed, is germinated. It is this soil plug, and not the plant, which is handled to effect the transplants herein shown.

Referring to FIG. 2, trays 90 are typically disposed between paired opposed channels 92, 94. The trays move downward under the force of gravity.

Referring to FIG. 3a, paired endless chains 110 are supported between sprockets 112 and 114. Lugs 115 are attached to the chains and protrude outward and in the path of the trays 90. These lugs support the trays 90 at the desired elevation.

Some attention can be given to the downward index of the chain, and hence the correspondent downward index of the lugs 90 and the supported trays. This detail can best be seen in FIG. 6a.

FIG. 6a shows a detail of the endless chains 110. Protruding outward from the chains 110 are a series of catch shafts 117. A plate 118 is reciprocated by a cylinder 119. It registers a U-shaped cavity, first with catch cylinder 117 and then with another catch cylinder 117 on the opposite side of the chain. Rotation of endless chains 110 occurs in increments. FIG. 6b illustrates a rotation of one increment. The planter tray falls in vertical and corresponding increments. Adjustment in height is made to obtain alignment of the tray 90 to the plant ejector mechanism.

It will be noticed that there is a gap 97 in the catch cylinders 117. Gap 97 permits the interval between adjacent trays 90 to pass without the chain stopping. Thus the plant exterior can pass from the last row of a tray to the first row of the next tray. Each row is in turn registered for plant extraction. Thus, side to side movement of the cylinder 119 effects a sequential registry of plants for extraction, even considering the gap between sequential trays.

Having considered the problem of vertical registry of the trays 90, horizontal registry of the trays can now be discussed. Referring briefly to FIG. 3a, it will be seen that there are eight plug extractors 130. With eight plug extractors 130, and a row of 40 plants, it will be seen that five sequential extraction steps of eight plants at a time are necessary. Thus, rack 100 must be moved from side to side. This side to side movement of rack 100 is accomplished by a cam mechanism shown in FIG. 3b.

Plant extractors 130 are spaced five plant spacings one from another. Movement of the tray one plant spacing to the side indexes the next group of eight plants for extraction. Five such indexing steps thus discharge a complete planted row. Referring to FIG. 3b, the mechanism for producing these steps is illustrated. Cam 120 is illustrated having cam follower 121 and cam surface 122 defined within the rotating wheel 120. The wheel is rotated in 10 steps of 36° each, compelled by a cylinder 123 at a rachet 124 on a rachet wheel 125.

For each movement of the wheel 120, there is a correspondent position of the cam follower 121. Specifically, and for a first row of plants to be extracted, movement of the tray in five incremental steps of ⅜ inch each is compelled by cam 120 at cam follower 121. After five such movements, the chain indexing mechanism of FIG. 6a is reciprocated and a return horizontal movement of cam 122 occurs over the next 180° of cam travel. As shown in FIG. 3a and FIG. 6a, a 180° cam 127 with follower 128 causes through relays the indexing of cylinder 119 when the dropping of the tray to the next row is needed.

Referring briefly to FIG. 2, and to the exaggerated arrows 119 drawn over the tray 90, it will be seen that the plant plugs are extracted from the tray as the tray itself moves in a square wave pattern. There are five cam compelled movements to the side followed by a dropping motion. Thereafter, there are five cam compelled movements in the opposite direction followed by another dropping by one row. This sequence is repeated until the tray is emptied of plugs. When the tray is emptied of plugs, and as shown by arrows 119a, a dropping approximately twice as great occurs when the juncture between two trays is spanned in the planter.

Assuming that registry has been adequately produced to the plug extractor mechanism 130, its function may now be discussed.

Referring to FIG. 3a, the plant extractor includes cylinder 131 which is clevice mounted at one end and attaches to a rocker bar assembly 132 at the opposite end. Upon expansion and contraction of cylinder 131, inward and outward movement of a plate 133 occurs. Plate 133, through a series of U-shaped indentations 134 defined therein, captures rods 137. Rods 137 mounted to respective sleeves 138 penetrate into and out of the side of the tray 90. Typically the rods are in the order of a quarter of an inch thick and penetrate to remove the soil plugs from the bottom end. Thus the plant is pushed into the receiving cylinder as is illustrated in FIG. 5a.

In FIG. 5a, it can be readily seen that the expansion of cylinder 131 urges rods 137 to extract registered plant plug P with plant P' from tray 90.

Having set forth the plant extraction mechanism, attention can now be devoted to mechanism which transports the plant to the ground. This includes a plant receiving cylinder 140 (see FIG. 2), plant transport tubes 150 (see also FIG. 2), and finally the dibble planter mechanism illustrated in operational detail in FIGS. 4a-4e.

Referring to FIG. 5a, a plant P' is shown contained within a soil plug P. This plant is shown and ejected into a cylinder 140, which includes a series of eight plant receiving concavities 141. Cylinder 140 is rotated about an arc of 90° from a plant receiving disposition, wherein concavity 141 is horizontally disposed, to a plant depositing position wherein concavity 141 is vertically disposed.

Referring to FIG. 5a, plug P is received within concavity 141. Cylinder 140 thereafter rotates and plug P typically falls into the funnel shaped receiving cavity 142. Plant P' is upwardly disposed when this occurs. Typically, an aperture extending through cylinder 140 registers to an air manifold 143, which causes air pressure to blow plug P down and into the funnel shaped cavity 142. Upon the plug's passage into funnel shaped cavity 142, the cylinder rerotates to the position shown in FIG. 5a. The process can be thus repeated.

In the position of FIG. 5a, second cavity 144 extending around the periphery of cylinder 140 defines an air passage between an air plenum 145 and the receiving funnel 142. Air from the plenum 145 passes to the funnel shaped cavity 142. Downward movement of the plug into the transport tubes 150 is impelled by the air blast. The plugs travel down the length of the tube to the planter mechanisms illustrated in FIGS. 4e-4e.

Referring to FIGS. 4a and 4b, the planter mechanism can be generally described and understood. First, the respective key elements of the planter mechanism will be recited. Thereafter, with reference to the cartoon series of FIGS. 4b, 4c, 4d and 4e, operation of the planter will be set forth.

Referring to FIG. 4a, it will be remembered that the eight respective tubes 150 have all received a plug P. Four such tubes will terminate on a chassis $E_1$; the remaining four tubes will terminate on a chassis $E_2$. Typically, tubes 150 are provided with suitable apertures 151 so that the air forced into tube 150 may be discharged at the end of plug travel. Typically, the plugs terminate in tubing on a single reciprocating plate 152 for each individual chassis. Plate 152 for all of the four respective dibble planters is actuated in reciprocation by a single cylinder 153 for each chassis $E_1$, $E_2$.

Referring to FIG. 4b, the planter mechanism includes two plungers which penetrate the earth. The first of these is a dibble plunger 160. Plunger 160 is a double acting hydraulic cylinder which penetrates into the ground the exact width and depth of the plugs to be planted. For example here the plunger penetrates approximately 1¾ inches of depth and slightly in excess of half an inch in diameter to establish the pilot hole for the subsequently placed plug. This penetration is made by a cylinder rod 161 at the ground engaging end 162.

Concentrically about the dibble cylinder 160, there is a dibble tube 163. Dibble tube or cylinder 163 is engaged by an offset cyllinder 164 which is also of the double acting variety. Cylinder 164 is keyed to the dibble tube 163 by keyed and threaded linkage 165 as illustrated in FIG. 4b. The uppermost end of the dibble cylinder 163 at 166 defines tapered edges for receiving not only the concentrically reciprocating dibble rod 161 but additionally the plant plug P when it is discharged into the top of the dibble cylinder. Finally, there is an airline 168 which communicates to an air chest or plenum 169 about the upper end of the dibble tube 163. Line 168 supplies air to the dibble actuating cylinder so that upon retraction, it leaves the planted plug P.

Having set forth the main operating parts of the planter mechanism, their collective function may now be described. Typically, the planter shown in FIG. 4a, moves forward to a position overlying the beds into which planting is to occur. Once in position, movement stops and the dibble tube planting sequence can begin.

First, and as illustrated in FIG. 4b, dibble plunger 160 plunges cylinder rod 162 into the soil. Typically, soil rod 162 penetrates through dibble tube 163 and penetrates the ground a depth sufficient to receive the soil plug. This much is shown in FIG. 4b.

Secondly, and after penetration of rod 162, dibble cylinder 163 penetrates the ground. It penetrates concentrically about rod 162 the full depth of the desired hole for the plug P.

Thereafter, rod 162 retracts. Upon this retraction, the apparatus looks exactly as illustrated in FIG. 4c with the dibble tube defining within the soil a cavity ready for the receipt of the soil plug P and contained plant P'.

It is important to notice that in the view in FIG. 4c, the upper edge of the dibble tube 163 at the tapered portion 166 is disposed immediately under reciprocating plate 152 and ready to receive the plug P once registry between the plug P and tube 163 is produced. This registry occurs upon reciprocation of plate 152 as illustrated in FIG. 4d.

Reciprocation is actuated by a cylinder 153 (see FIG. 4a). This cylinder causes the common plate on a chassis to reciprocate. The planter unit illustrated in FIG. 4d illustrates such reciprocation.

In the reciprocation, the dibble cylinder 160 is reciprocated to the side while the dibble tube 163 remains in place. This causes tube 150 to be registered to the top of the dibble tube 163. Typically, the plug P is blown by the air supply within tube 150 down and through the dibble tube 163 into a planted position in the ground.

Finally, plate 152 returns from its reciprocated position. Thereafter, and as illustrated in FIG. 4e, dibble tube 163 moves upward. At the same time, tube 168 forces air into plenum 169 defined about the upper edge of the dibble tube. Air is forced downwardly through the dibble tube to insure the plug P remains planted while the dibble tube 163 is retracted by its cylinder 164.

Once the dibble tube cylinder 163 is in the upward position, and planting is completed, the apparatus moves forwardly slightly less than the length of the chassis $E_1$, $E_2$. Typically, forward movement is effected until a distance measuring wheel steps off the incremental space for the next four plants. The machine then stops and the cycle recommences.

It will be realized that the operation of only one of the eight dibble planters on each of the chassis $E_1$, $E_2$ has here been illustrated. As such parts are all identical, further repetition will not herein be given.

The various hydraulics are actuated with conventional controls. These conventional controls will not be discussed, save and except to broadly set forth the steps and sequences utilized with the planter disclosed herein. Typically, the planter upon being towed has the distance measuring wheel come to a stop with the brake depressed and the clutch open. This completes timing step one.

Once the sled is stopped, the dibble plungers 160 are actuated to force the holes for the plant in the ground. At the same time, rods 137 cause dislodgment of a group of eight plants from the tray into the rotating cylinder 140. This completes timing step two.

In step 3 of the disclosed timing, the dibble tubes 163 penetrate about the previously placed dibble plungers 161. Simultaneously, the rods 137 (see FIG. 3a) retract leaving the respective plants in the horizontal cavities within the cylinder 140. At the same time, the dibble plungers 161 will retract from their ground penetrating position.

As a fourth timing step, the sliding plate will index and cause the plugs to drop into the empty dibble tubes and into the planted position in the ground.

As a fifth timing step in the sequence, the cylinder 140 rotates 90°. It rotates from receiving the plug and plant in the horizontal position to a vertical position.

It is interesting to note that in this stage of operation of the timing sequence of the machine, the plug P is passing from the tube 150 to the dibble tube 163. At the same time and at the upper end of the tube 150, another in the series of plugs is being deposited in the funnel 142. Due of course to the length of travel, the plugs do not catch each other in the sequence disclosed.

In the sixth timing step, plate 152 actuated by cylinder 153 slides back into position.

As a seventh timing step, dibble tubes 163 are raised to the up position. As a completing and eight timing step, the rotary catch cylinder 140 rotates to the plug receiving position. At the same time the air plenum 145 is communicated with the funnels 142 moving the plug under air pressure to the bottom of the tubes 150.

The hydraulic controls herein disclosed and the clock disclosed to run them are all conventional. Moreover, the exact sequence of machine operation can be varied, so long as the parameters of the planting and the like herein illustrated are all adhered to. Modification can be made to this invention within the spirit of the attached claims.

What is claimed is:

1. Apparatus for the transplant of plant containing plugs from trays into a field having elevated seed beds contained between paired furrows, said apparatus comprising: a transport frame having first and second ground support members for passage within said furrows, said furrows having at least one plant bed defined between said furrows; at least one planting chassis suspended from said transport frame; a plug extractor supported on said transport frame; said plug extractor including means for registering columns of plant containing plugs from a vertically supported and adjustable rigid carrying tray mounted on a horizontally adjustable support frame, said tray having rows and columns of plant containing plugs for extraction from said tray; said rigid carrying tray forming the sole support for said plugs; plug extractors, including ejectors, for contacting a group of plugs in a column of plugs from one side of said tray to cause the horizontal discharge of plugs to a plurality of plug receiving stations on the opposite side of said tray; a member defining said plurality of plug receiving stations, each station registered to said tray at a position of extraction of said plugs; said member juxtaposed to said tray to receive said plugs upon extraction; means for moving said member to register said plug receiving stations to plug receiving tubes; dibble planters for said tubes; a plug receiving tube extending from each plug receiving station to and towards one dibble planter mechanism at least two of said dibble planters being aligned with the direction of travel of said apparatus; air supply means for each said plug receiving tube; said chassis including a registry means for each tube; a dibble planter at each said registry means, each said dibble planter including a first solid sectioned cylinder for penetration into the ground to define within said ground a ground aperture the size and volume of said plug; a second hollow sectioned cylinder reciprocal about the first cylinder for receiving interiorly said first cylinder to hold the ground adjacent to said first cylinder; said registry means including horizontal sliding means for vertical registry of said tube to said second hollow sectioned cylinder when said first cylinder is withdrawn to permit air assisted gravity discharge of plugs within said tubes into the ground aperture in said ground whereby when said second cylinders are retracted, said plug resides in said ground.

2. The invention of claim 1 and including means for pulling said ground support members along the ground, a distance measuring wheel mounted for support to said ground; said distance measuring wheel operably connected to said means for pulling to advance said pulling means in increments for planting sequentially groups of soil plugs in the ground.

3. The invention of claim 1 and wherein said ground support members include a sled having a ground support member including first and second spaced apart runners and said runners are variable in side to side spacing for matching variable furrow spacing.

* * * * *